United States Patent
Besenhard et al.

(10) Patent No.: US 6,942,949 B2
(45) Date of Patent: Sep. 13, 2005

(54) RECHARGEABLE LITHIUM ELECTROCHEMICAL CELL

(75) Inventors: Jürgen Otto Besenhard, Graz (AT); Kai Christian Möller, Graz (AT); Gisela Fauler, Graz (AT); Martin Winter, Fernitz (AT)

(73) Assignee: LG Chem, Ltd., Seoul (KR)

( * ) Notice: Subject to any disclaimer, the term of this patent is extended or adjusted under 35 U.S.C. 154(b) by 152 days.

(21) Appl. No.: 10/217,319

(22) Filed: Aug. 12, 2002

(65) Prior Publication Data

US 2004/0029017 A1 Feb. 12, 2004

(51) Int. Cl.$^7$ ................................................ H01M 6/16
(52) U.S. Cl. ....................... 429/330; 429/331; 429/332; 429/326; 429/338; 429/342; 429/231.1; 429/231.4; 429/231.8
(58) Field of Search ................................ 429/338, 342, 429/326, 330, 231.8, 231.1, 231.4, 331, 332

(56) References Cited

U.S. PATENT DOCUMENTS

2002/0015885 A1 * 2/2002 Hara et al. .................. 429/212
2002/0018926 A1 * 2/2002 Shiga et al. ............. 429/231.8

* cited by examiner

Primary Examiner—Laura Weiner
(74) Attorney, Agent, or Firm—Baker Botts LLP

(57) ABSTRACT

A secondary battery is comprised of a positive electrode, a negative electrode formed from a lithium storage material, and a non-aqueous electrolyte. The non-aqueous electrolyte includes a lithium salt, non-aqueous aprotic solvent(s), such as ethylen carbonate, propylene carbonate, dimethyl carbonate, ethymethyl carbonate and diethyl carbonate, and a small percentage of at least one organic additive. The negative electrode may comprise a carbon such as graphite, and the positive electrode may comprise a lithiated metal oxide or phosphate, such as $LiCoO_2$, $LiNiO_2$, $LiMn_2O_4$, $LiFePO_4$, or mixtures thereof. The organic additives have one or more unsaturated bonds activated with respect to oxidation by electron-pushing alkyl groups. They are in most cases known to be able to undergo polymerization reactions, such as an anodically induced polymerization especially under certain conditions. The additives are oxidized at the cathode at a potential of more than 4.3 V vs. $Li/Li^+$. With these additives in amounts of 0.001 to 10%, a passivation layer is formed on the cathodes, and the sensitiveness of the battery against overcharge is reduced. The electrolyte mixtures do not deteriorate the properties of the battery anodes.

6 Claims, 3 Drawing Sheets

RECHARGEABLE LITHIUM ELECTROCHEMICAL CELL

BACKGROUND OF THE INVENTION

1. Field of the Invention

The present invention relates to a secondary lithium battery comprising a positive electrode, a negative electrode formed from a lithium storage material and a non-aqueous electrode. More specifically, the present invention relates to a rechargeable lithium electrochemical cell comprising a cathode, an anode containing lithium storage materials, and an electrolyte comprising a lithium salt and one or more saturated aprotic solvents.

2. Description of the Prior Art

The layered transition metal oxide, $LiCoO_2$, is the most commonly used cathode material for rechargeable lithium ion batteries, because it has high specific capacity, high operating cell voltage and excellent rechargeability. The theoretical capacity is high at about 275 mAh/g. In practical application, however, the maximum obtainable capacity is about 140 mAh/g, corresponding to a maximum voltage charge of about 4.2 V. $LiCoO_2$ adopts a hexagonal structure consisting of $CoO_2$ layers separated by a Van der Waals gap. The octahedral sites within the Van der Waals gap are occupied by the lithium ions. This results in reversible intercalation of lithium.

In the case of overcharge in the region of potential higher than 4.2 V, a severe loss of capacity occurs mainly due to the increase in the amount of cobalt dissoluted, which was found to correlate with large anisotropic structural changes. As lithium is removed, the repulsion between the negatively charged $CoO_2$ layers is enhanced, resulting in expansion of the c-axis. Due to the screening effect of lithium ions, only half of the lithium can be reversibly removed. When it is fully delithiated, the $LiCoO_2$ structure is irreversibly destroyed.

The full delithiation of a balanced cell with a $LiCoO_2$ cathode leads to lithium plating on the anode, because twice the amount of lithium necessary for the charge is delivered. The formed dendrites can cause short circuits, followed by heat generation, melting of lithium and thermal runaway of the battery.

When cells are charged to a voltage greater than 4.2V, electrolyte oxidation also occurs. Although small, continuous oxidation can influence the capacity, cycle life, and safety of the cell. The oxidation consumes the electrolyte and often generates gaseous products (K. Kumai, H. Miyashiro, Y. Kobayashi, K. Takei and R. Ishikawa, *J. Power Sources* 1999, 81–82, 715–719). Therefore, the cells become dry, the capacity decreases, and the internal pressure of the cell increases, thereby increasing the risk of explosion.

A direct electrochemical reaction between the cathode and the electrolyte causes oxidation of the electrolyte and is considered as a major course of self-discharge (S. Matsuta, Y. Kato, T. Ota, H. Kurokawa, S. Yoshimura and S. Fujitani, *J. Electrochem. Soc.* 2001, 148(1), A7–A10). Many studies on the reactions between the positive electrode and the electrolyte have been published. Methods such as electron-spin-resonance (ESR) (S. Matsuta, et. al., supra), infrared and Raman spectroscopy (T. Itoh, N. Anzue, M. Mohamedi, Y. Hisamitsu, M. Umeda and I. Uchida, *Electrochemistry Communications* 2000, 2, 743–748), X-ray diffraction measurements, and differential electrochemical mass spectrometry (K. Kanamura, *J. Power Sources* 1999, 81–82, 123–129; P. Novak, J.-C. Panitz, F. Joho, M. Lanz, R. Imhof and M. Coluccia, *J. Power Sources* 2000, 90, 52–58; M. Moshkovich, M. Cojocaru, H. E. Gottlieb and D. Aurbach, *J. Electroanal. Chem.* 2001, 497, 84–96) were used for characterizing the reactions.

The overcharge of lithium batteries can be prevented by different methods (G. Venugopal, *J. Power Sources* 2001, 101, 231–237). Usually, the cell voltage is controlled via electronic devices, and the charging procedure is stopped at a default cut-off potential. In the case of overcharge, an irreversible cut-off is provided by a current interrupt device (CID) or a thermal fuse activated by the heat generated during the overcharge, or by pressure of generated gaseous products. Also, the use of shutdown separators irreversibly activated within a narrow temperature range is widespread. In addition to these irreversible cut-off mechanisms, some cells also contain a positive-temperature-coefficient (PTC) device that provides current-limiting capability over a wide temperature range.

The addition of additives to the electrolyte is also used to initiate a current cutoff or to limit the cell voltage internally. The additives can therefore be classified by their mode of action as follows:

Redox shuttle additives: The redox shuttle approach to overcharge protection employs an electrolyte additive which acts as an internal current shunt when the charging potential exceeds the oxidation potential of the additive. Applications of this concept to overcharge protection in rechargeable lithium batteries have been reported (T. J. Richardson and P. N. Ross Jr., *J. Power Sources* 1999, 84, 1–5). The additives include, for example, dihydrophenazine derivatives (F. Tran-Van, M. Provencher, Y. Choquette and D. Delabouglise, *Electrochim. Acta* 1999, 44, 2789–2792) and polypyridine complexes of iron (C. S. Cha, X. P. Ai and H. X. Yang, *J. Power Souces* 1995, 54, 255–258).

Gassing additives: If the oxidation potential of these additives is exceeded, their electrochemical decomposition leads to gas formation and an increase of the internal cell pressure. The corresponding batteries are equipped with a electronic disconnect device activated by a default overpressure. The suitable additives include compounds, such as phenyl-R-phenyl compounds, for example, 2,2-diphenylpropane (J. N. Reimers and B. M. Way, U.S. Pat. No. 6,074,777 1998) and alkyl benzene derivatives (E. Masuko, JP 5036439 1993).

Polymerizable additives: These additives are polymerized at high voltages, thereby increasing the internal resistance of the battery and thus protecting it. Aromatic additives such as biphenyl, 3-chlorothiophene, and furan are particularly suitable for certain lithium batteries (H. Mao, U.S. Pat. No. 5,879,834 1996). Electrolyte additives, which electrochemically form conductive polymers, can be used to create a short circuit inside the battery, as a result of overcharge abuse, and also can be used to automatically discharge the battery internally. Aromatic compounds, such as biphenyl are particularly suitable additives (H. Mao and D. S. Wainwright, U.S. Pat. No. 6,074,776 1998).

SUMMARY OF THE INVENTION

The present invention concerns a secondary lithium battery with an electrolyte consisting of a lithium salt, a non-aqueous solvent, such as ethylen carbonate, propylene carbonate, dimethyl carbonate, ethymethyl carbonate and diethyl carbonate, and a small percentage of at least one organic additive.

In accordance with the present invention, a rechargeable lithium electrochemical cell is provided, comprising:

(a) a cathode;

(b) an anode containing lithium storage materials; and (c) an electrolyte comprising a lithium salt and one or more saturated aprotic organic solvents, wherein the electrolyte further comprises an additive in a proportion of 0.001% to 10% by volume of said solvents, which is an organic compound containing at least one unsaturated carbon-carbon bond activated with respect to oxidation by electron-pushing alkyl groups, and which can be oxidized at the cathode at a potential of more than 4.3 V vs. Li/Li$^+$.

BRIEF DESCRIPTION OF THE DRAWINGS

Further features and advantages of the present invention will become clear from the following examples of embodiments which are given by way of a non-limiting illustration, and with reference to the accompanying drawings, in which.

DETAILED DESCRIPTION OF THE PREFERRED EMBODIMENTS

Figure 1:
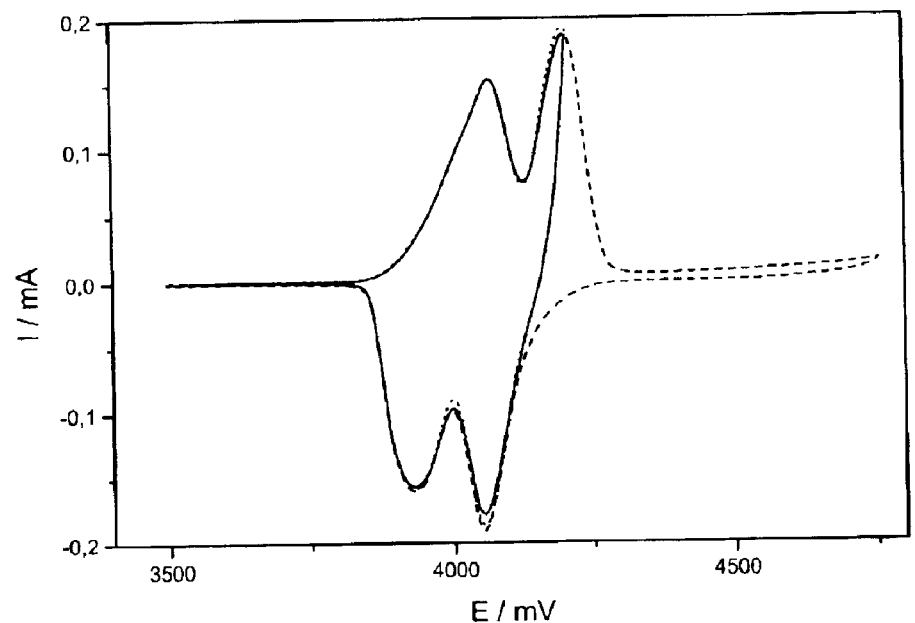
FIG. 1 shows the cyclic voltammograms for a prior art cell without additive: 5$^{th}$ cycle (thin solid line), 6$^{th}$ overcharge cycle (broken line) and 7$^{th}$ cycle (thick solid line)

The additives according to the present invention contain at least one unsaturated carbon-carbon bond activated with respect to oxidation by electron-pushing groups. They are in most cases known to be able to undergo polymerizations, especially anodically induced polymerization under certain conditions. The additives are oxidized at the cathode at a potential of more than 4.3 V vs. Li/Li$^+$. The presence of an unsaturated bond with electron-pushing groups facilitates oxidation of the compound at potentials between 4.0 and 5.0 V.

During an overcharge of the cell, the soluble compound added to the electrolyte is oxidized at a potential, which is higher than the usual operating range. During the overcharge, the oxidation of the compound consumes electrical current, in which a passivation layer is possibly formed on the cathode material. The formation of the passivation layer may be supported by a precipitation mechanism, where, by a network of polymer chains, the oxidation products of the electrolyte are retained at the electrode surface and remain available for incorporation in the passivating film without being washed out of the first formed layers.

In one preferred embodiment, the mixture of solvents comprises propylene carbonate, and the additive is selected from 1,5-hexadiene, cyclohexene, and 4-vinylcyclohexene.

The compound is added in a proportion of 0.001% to 10%, preferably 0.01% to 5.0%, and more preferably 0.1% to 5.0% by volume of the mixture of solvents. With additives in the amounts of 0.001 to 10%, passivation layer is formed on the cathodes and the sensitiveness of the battery against overcharge is reduced.

Most solvents or mixtures of solvents which are normally used in lithium electrochemical cells and which contain a first solvent with a high dielectric constant and a second solvent with low viscosity, can also be used together with the additives.

The lithium salt is selected from lithium perchlorate (LiClO$_4$), lithium hexafluorophosphate (LiPF$_6$), and lithium trifluoromethane sulfonimide (LiN(CF$_3$SO$_2$)$_2$) or derivatives thereof.

The cathode may be selected from transition metal oxide based cathodes selected from the group consisting of lithiated oxides of manganese, nickel, iron and cobalt, and mixtures thereof. The anode may consist mainly of a graphite carbon.

EXAMPLE 1

Prior Art

An electrode was formed by mixing 85% by weight LiMn$_2$O$_4$, 10% by weight carbon black (Degussa Printex XE2) and 5% by weight polyvinylidenedifluoride (PVdF). The mixture was stirred with 2 mL of N-methylpyrrolidinone and painted on a titanium mesh. The electrode was dried and pressed.

The electrolyte was composed of propylene carbonate and a lithium salt (lithium perchlorate, lithium hexafluorophosphate or lithium trifluoromethane sulfonimide) at a concentration of 1M.

For electrochemical experiments a glass cell was assembled. Lithium strips served as reference and counter electrodes, which were immersed into 8 mL of the electrolyte.

The cell was then examined at room temperature with (1) cyclic voltammetry and (2) constant current charge/discharge/overcharge.

(1) Cyclic Voltammetry

In the cyclic voltammetry experiments, five sweeps were measured in a potential range of 3.5 to 4.2 V to verify the stability of the electrode and the electrolyte for normal cycling conditions. To see the effect of the added polymerizable compound, the electrodes were overcharged with a potential surpassing the oxidation onset of the additive: one voltammogram with a high vertex potential of 4.75 V was measured. In the subsequent five sweeps in the normal potential range, the behavior of the electrode after the overcharge step was observed.

The sequence of steps in the following overcharge experiments was as follows:

five scans in a potential range of 3.5 to 4.2 V;

one overcharge scan in a potential range of 3.5 to 4.75 V;

further five scans in a potential range of 3.5 to 4.2 V.

The scan rate was 50 $\mu$V/s in all experiments.

In FIG. 1, the cyclic voltammograms of the prior art cell with the two (de-) intercalation peaks of the LiMn$_2$O$_4$ can be seen at 4.1 and 4.2 V. During the first five cycles the peaks (thin solid line) are stable at the same height, which indicates that the additive had no influence on the electrode capacity. The current during the overcharge between 4.3 and 4.75 V is very low (less than 10% of the deintercalation peak current). After an overcharge cycle up to 4.75 V, the peaks are not altered, indicating no evidence of a filming process.

(2) Constant Current Charge/discharge/overcharge

This program simulates a single exhaustive overcharge of a battery. Five cycles have been carried out with a constant current in a potential range of 3.5 to 4.2 V to verify the stability of the electrode and the electrolyte for normal cycling conditions. Afterwards, to see the effect of the added polymerizable compound, the electrodes were overcharged as long as the specified cut-off potential above the oxidation onset of the additive was reached. During the subsequent five cycles the behavior of the electrode after the overcharge step was observed.

The sequence of steps in these overcharge experiments was as follows:

five cycles in a potential range of 3.5 to 4.2 V;

one overcharge cycle until the potential reaches 4.75 V;

further five cycles in a potential range of 3.5 to 4.2 V.

The current was 25 $\mu A$/mg in all experiments.

Figure 2:
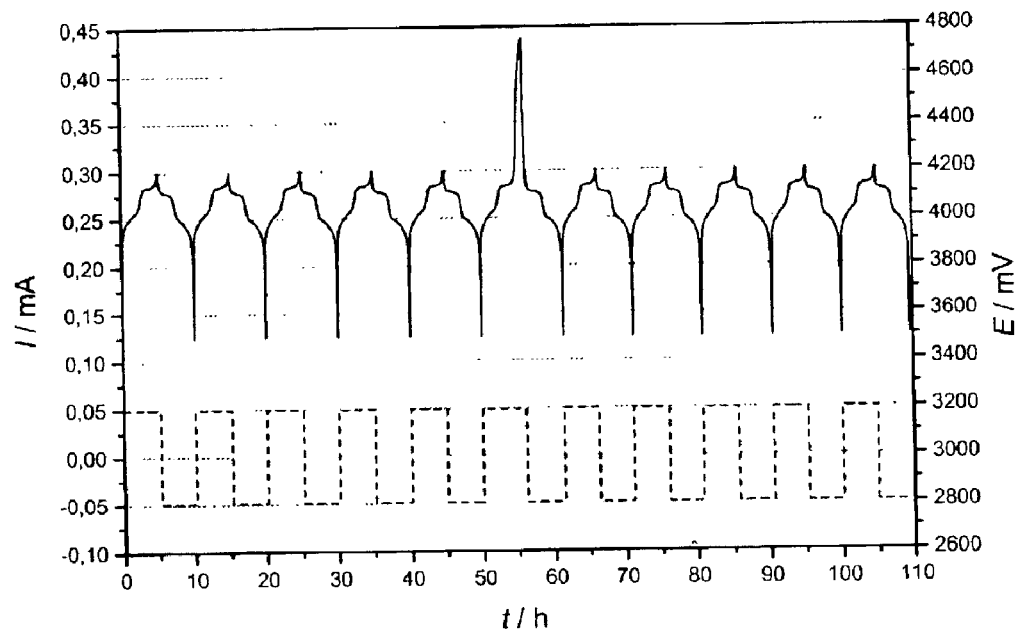
FIG. 2 shows a cycling study in PC/LiClO$_4$ without additive.
Figure 3:
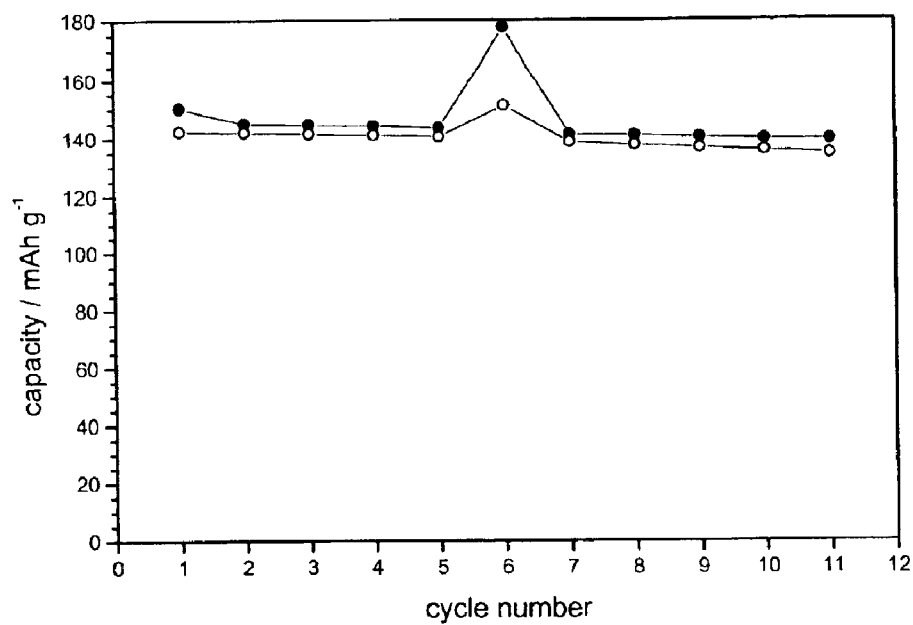
FIG. 3 shows the charge (- -) and discharge capacities (- -) of the cycling study without additive.

FIG. 2 represents the charge/discharge of the prior art cell. It shows that during the overcharge step, the cell voltage rises immediately to 4.75 V after approximately 23% of overcharge. The electrode capacities shown in FIG. 3 remain untouched in the overcharge step, and the effects of filming on the electrode cannot be detected.

EXAMPLE 2

A cell in accordance with the invention was produced which was analogous to that described in Example 1, except that it contained an analogous electrolyte, which contained in addition 1% of an unsaturated organic compound. The test conditions were analogous to those given in example 1.

Figure 4:
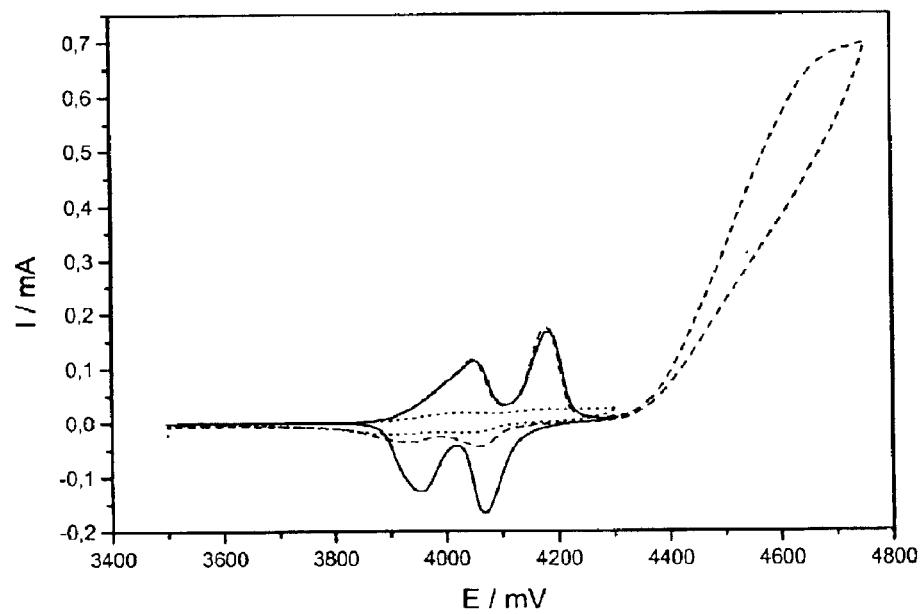
FIG. 4 shows the cyclic voltammograms in accordance with the present invention in PC/LiClO$_4$ with 1% cyclohexene: 5$^{th}$ cycle (solid line), 6$^{th}$ overcharge cycle (broken line) and 7$^{th}$ cycle (dotted line)

FIG. 4 represents cyclic voltammograms of the cell in accordance with the invention. During the overcharge up to 4.75 V (broken line) the current increased in all cases showing the electrochemical reaction of the additive. Indication for successful "shut down" filming is evident. By an approximate 90% decrease in peak height in the $7^{th}$ cycle (dotted line), the overcharge to 4.75 V parts of the electrode became electrochemically inactive. At these parts, subsequent oxidation of the electrolyte during following overcharges should be prevented.

Figure 5:
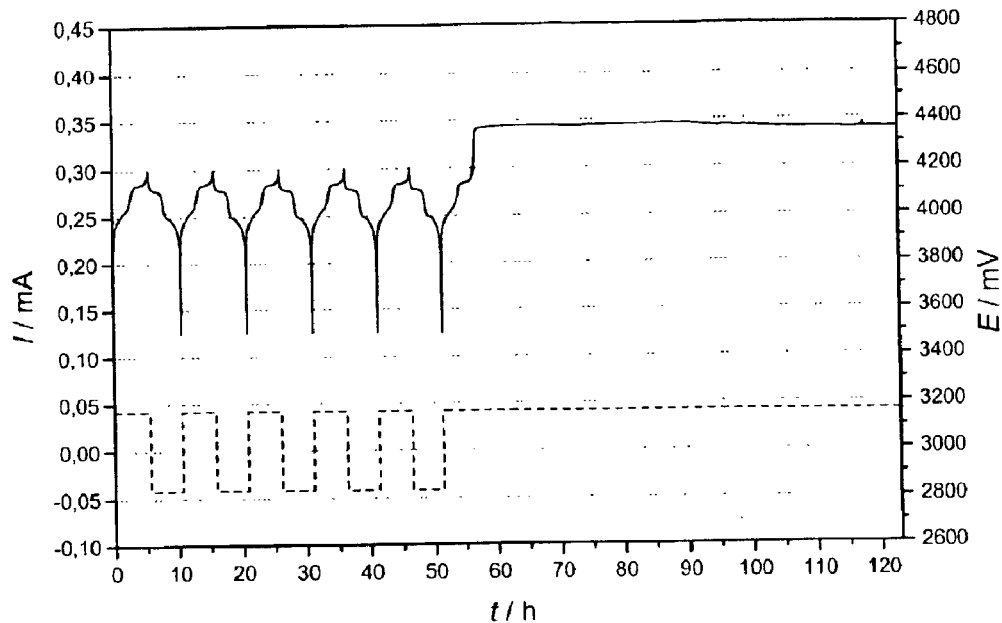
FIG. 5 shows a cycling study in accordance with the present invention. The 6$^{th}$ (overcharge step) was stopped after 44 hrs.
Figure 6:
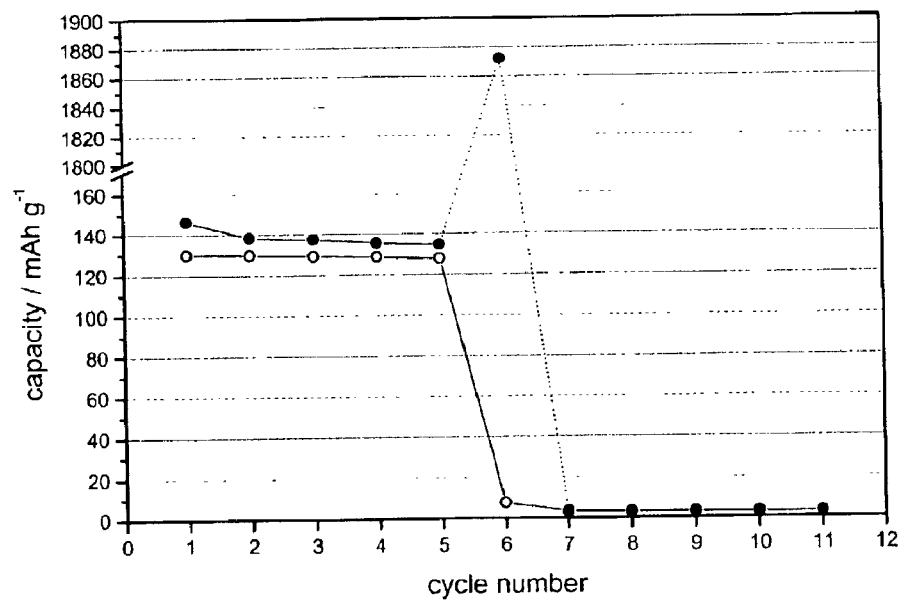
FIG. 6 shows the charge (- -) and discharge capacities (- -) of the cycling study in accordance with the present invention.

FIG. 5 represents the charge/discharge of the cell in accordance with the invention. The cathode could withstand an overcharge of 1400% without reaching more than 4.4 V. After the overcharge the cathode was inactive to intercalation/deintercalation and did not show any capacity (see FIG. 6). In this case the additive seems to be very effective in keeping the cell voltage below a certain value and to produce a shut-down effect. It is remarkable that despite this strong effect, no negative influence in the normal potential range occurred.

While the description above refers to particular embodiments of the present invention, it will be understood that many modifications may be made to the present invention without departing from the spirit thereof. The accompanying claims are intended to cover such modifications as would fall within the true scope and spirit of the patent invention.

The presently disclosed embodiments are therefore to be considered in all respects as illustrative and not restrictive. The scope of the invention is indicated by the appended claims, rather than the foregoing description. All changes, which come within the meaning and range of equivalency of the claims, are therefore intended to be embraced therein.

What is claimed is:

1. A rechargeable lithium electrochemical cell comprising:

(a) a cathode;

(b) an anode containing lithium storage materials; and (c) a liquid electrolyte comprising a lithium salt and one or more saturated aprotic organic solvents, wherein the electrolyte further comprises an additive in a proportion of 0.001% to 10% by volume of said solvents, which is an organic compound containing at least one unsaturated carbon-carbon bond activated with respect to oxidation by electron-pushing alkyl groups, and which can be oxidized at the cathode at a potential of more than 4.3 V vs. Li/Li$^+$ to form a passivation layer on the cathode in which said additive is selected from the group consisting of 1,5-hexadiene, cyclohexene, and 4-vinylcyclohexene.

2. The cell according to claim 1, in which said additive is added in a proportion of 0.1 to 5.0% by volume of said solvents.

3. A cell according to claim 1, in which the saturated aprotic organic solvent is selected from the group consisting of ethylene carbonate, propylene carbonate, dimethyl carbonate, ethylmethyl carbonate and diethyl carbonate.

4. The cell according to claim 1, in which said lithium salt is selected from the group consisting of lithium perchlorate, lithium trifluoromethane sulfonimide, and lithium hexafluorophosphate or derivatives thereof.

5. The cell according to claim 1, in which said cathode is selected from the group consisting of a transition metal based cathode selected from the group consisting of lithiated oxides of manganese, nickel, iron and cobalt, or mixtures thereof.

6. The cell according to claim 1, in which said anode consists mainly of a graphite carbon.

* * * * *